United States Patent [19]

Nishizawa et al.

[11] 4,425,143

[45] Jan. 10, 1984

[54] ADSORPTION BY ZEOLITIC COMPOSITION

[75] Inventors: Junichi Nishizawa; Rensaku Suzuki; Kenji Aizawa, all of Sendai, Japan

[73] Assignee: Shin Tohoku Chemical Industries Inc., Japan

[21] Appl. No.: 295,387

[22] Filed: Aug. 24, 1981

Related U.S. Application Data

[63] Continuation of Ser. No. 108,146, Dec. 28, 1979, abandoned.

[30] Foreign Application Priority Data

Dec. 29, 1978 [JP] Japan ................... 53-162338
Dec. 29, 1978 [JP] Japan ................... 53-162339
Dec. 29, 1978 [JP] Japan ................... 53-162340
Jan. 10, 1979 [JP] Japan ................... 54-2032

[51] Int. Cl.$^3$ ............................... B01D 53/04
[52] U.S. Cl. ............................... 55/31; 55/33; 55/75; 55/208; 55/389; 422/169; 423/219; 423/351
[58] Field of Search ............. 55/68, 75, 208, 387, 55/389, 31, 33; 209/567, 576, 577, 580, 581, 589; 252/455 Z; 423/219, 351; 422/169

[56] References Cited

U.S. PATENT DOCUMENTS

| | | | |
|---|---|---|---|
| 1,588,258 | 6/1926 | Metzger .......................... | 423/219 |
| 1,874,537 | 8/1932 | Jaycox ............................ | 55/208 |
| 2,396,474 | 3/1946 | Riley ............................... | 55/208 X |
| 2,591,543 | 4/1952 | Haywood et al. .............. | 423/219 |
| 2,604,760 | 7/1952 | Southern ........................ | 55/208 X |
| 2,874,030 | 2/1959 | Dennis ........................... | 423/219 X |
| 3,013,982 | 12/1961 | Breck et al. .................... | 252/455 Z |
| 3,013,990 | 12/1961 | Breck et al. .................... | 252/455 Z |
| 3,200,569 | 8/1965 | Wheeler ......................... | 55/208 |
| 3,255,101 | 6/1966 | Arey, Jr. et al. ............... | 252/455 Z |
| 3,283,479 | 11/1966 | Batzer et al. ................... | 55/389 X |
| 3,335,550 | 8/1967 | Stern .............................. | 55/208 |
| 3,469,375 | 9/1969 | Barrington et al. ............ | 55/208 |
| 3,472,375 | 10/1969 | Mathews ........................ | 209/576 |
| 3,598,518 | 8/1971 | Goto ............................... | 423/219 |
| 3,701,419 | 10/1972 | Hutter et al. ................... | 209/567 X |
| 3,969,481 | 7/1976 | Murray et al. .................. | 423/219 |
| 4,025,321 | 5/1977 | Anderson et al. .............. | 423/219 X |

FOREIGN PATENT DOCUMENTS 2271880 12/1975 France ............................ 209/589

OTHER PUBLICATIONS

Batzer et al., Zedite Gettering for the Production of an Ultrahigh Vacuum, The Review of Scientific Instruments, vol. 36, No. 3, 3/1968, pp. 328-330.
Breck, Zeolite Molecular Sieves, 1974, pp. 49, 50, 139, 162, 163, 205-207, 213, 231, 605, 618, 619, 625, 740, 741.
Breck, Zeolite Molecular Sieves, 1974, pp. 16-18.

*Primary Examiner*—Robert H. Spitzer
*Attorney, Agent, or Firm*—McGlew and Tuttle

[57] ABSTRACT

Natural zeolite minerals which have a high silicon-to aluminum atomic ratio (hereinafter referred to as Si/Al ratio) and a fibrous micro-structure in at least some parts are ore-dressed and classified according to the iron impurity content converted in terms of iron oxide $Fe_2O_3$. Zeolite with high Si/Al ratio is excellent in resistance to acid and heat and can be re-activated at high temperatures. The fibrous microstructure is considered to impart a high degree of mechanical strength to the zeolite after pelletization. High-grade natural zeolites with small iron impurity content uniformly exhibit high adsorption performance.

In particular, zeolite adsorbents using natural zeolite consisting principally of mordenite are very useful for various purposes.

In the case of removing oxygen, the combined use of the zeolite adsorbent and an oxygen removing catalyst provides good results. By cooling the zeolite adsorbent down to low temperatures, its adsorption performance rises sharply. The zeolite adsorbent is of particular utility when employed for purification of gas, removal of water vapor from a vacuum system, removal of undesirable components and so forth.

14 Claims, 13 Drawing Figures

ADSORPTION BY ZEOLITIC COMPOSITION

CROSS REFERENCE TO RELATED APPLICATION

This is a continuation of co-pending application Ser. No. 108,146 filed Dec. 28, 1979 and now abandoned.

BACKGROUND OF THE INVENTION

1. Field of the Invention

This invention relates to natural zeolite adsorbents, and more particularly to adsorbents and purification by adsorbents employing natural zeolite containing iron impurity below predetermined levels.

2. Description of the Prior Art

It is well known that zeolite adsorbing agents such as molecular sieves or the like exhibit excellent adsorption performance. When using zeolite as an adsorbent, it is desired that the adsorbent be low in manufacturing cost, excellent in adsorption performance and capable of repeated re-activation for long use. For the reduction in manufacturing cost, it is desired that natural resources be used as effectively as possible; for the capability of repeated re-activation, it is desired that the material used be excellent in resistance to acid and heat; and, for high adsorption performance, the material should have high intrinsic adsorption potentials and it is desired that some definite criteria be set up for ascertaining the suitability of the raw zeolite ores for use as the adsorbent in terms of its impurity content.

Up to now, however, substantially no satisfactory zeolite adsorbents or methods for selecting zeolite minerals therefor have been proposed which meet such requirements as mentioned above. In the past, use has been made of relatively expensive synthetic zeolites commonly referred to as molecular sieves.

Japan and some other countries are abundant in resources of natural zeolite of good quality (especially mordenite and clinoptilolite), and it is highly desired to make effective use of natural mordenite and natural clinoptilolite. In connection with the natural zeolite, however, problems arising from its composition, impurity content and so forth with respect to the adsorption performance have not been made clear and solved yet, so that the natural zeolite has hardly been used as a high quality desiccating agent for it retains unsolved problems in the quality and reliability as a desiccating agent.

Of the natural zeolite resources, analcite, mordenite and clinoptilolite are available relatively cheaply and abundantly. In particular, mordenite and clinoptilolite have already been exploited commercially and employed for various purposes. Mordenite and clinoptilolite are very similar in chemical composition to each other, and their Si/Al ratios, i.e. their silicon to aluminum atomic ratios, are both about 4 or more, which is very high for use as zeolite; they are stable chemically and have excellent acid and heat resistances. Further, natural mordenite has a high degree of mechanical strength. The Si/Al ratio may sometimes be represented in the term of molar ratio and, in such a case, the $SiO_2/Al_2O_3$ molecular ratio becomes twice the Si/Al atomic ratio.

The potential capacities of natural zeolite as an adsorbent have been recognized, but natural zeolite is usually low in purity and poorer in adsorption performance than the synthetic zeolite and a proper, convenient ore-dressing method has not been established, so that the use of natural zeolite as adsorbing agents is much restricted. For example, since a pelletized catalyst of the synthetic mordenite is low in mechanical strength even when some binder material such as clay is added, natural mordenite may in some cases be added to the synthetic mordenite so as to provide for increased mechanical strength.

Molecular sieves A and X which are well-known synthetic zeolites are low in acid resistance and in heat resistance. Their crystal structures are changed by high-temperature heating and destroyed by acid. Accordingly, they cannot be re-activated at high temperatures and cannot be used in an acidic solution or in an acidic atmosphere. Low temperature re-activation will lead to decrease in adsorption due to incomplete re-activation. In contrast thereto, natural mordenite and natural clinoptilolite have a high $SiO_2/Al_2O_3$ molar ratio, and hence are stable in crystal structure and high in acid resistance and in heat resistance.

A proper classification of natural zeolite to guarantee a high degree of adsorption performance coupled with the abovesaid advantages, will broaden its application.

Description will be given of some technical fields to which natural zeolite can be applied. In the fields, for example, of chemical and of semiconductor industries, there are often needed fluids free of undesirable impurities such as water vapor or the like. This happens, for example, in the case of filling a high-temperature reaction furnace with an inert gas or hydrogen gas for preventing an unwanted chemical reaction between the reactant and the furnace material being heated. In such a case, the lowest guaranteed dew point is more important than the maximum amount of water which the adsorbent can adsorb. When the adsorbing agents are to be repeatedly re-activated for long use, the re-activation efficiency, i.e. to what extent the adsorption performance can be revived, is important if the initial maximum adsorption performances are the same. For complete release of adsorbed water, a high re-activation temperature is desired, but molecular sieves 4A and the like have the defect of low heat resistance.

It is known that a very small amount of water content greatly influences the quality of products in the crystal growth of a material free from water of crystallization, in the substrate treatment for vacuum evaporation, in the fabrication of glass fibers and go forth.

Where it is desired to remove as much water as possible, if the manufacturing process involves treatment in a fluid, much care is necessary in pretreatment of the fluid. If any water remains in the fluid, then it will adhere very easily to the surface of an article being treated and will not be readily removed therefrom.

Well-known desiccating agents are active carbon, silica gel, molecular sieves (synthetic zeolite). As higher desiccating agents for industrial use, molecular sieves NaA and the like are often employed partly because of their high adsorption performance and partly because of availability of chemically stable ones of constant quality, but their adsorption performance is not very satisfactory.

When used as desiccating agents, the molecular sieves are usually re-activated by heating for repeated use, but the adsorption performance of ordinary molecular sieves decreases with an increase in the number of re-activations; accordingly, they cannot be re-activated too many times if one desires very high adsorption performances. The cause of this shortcoming is considered to arise chiefly from insufficient removal of adsorbed substances due to low re-activating temperatures. The ordinary molecular sieves are poor in their heat resistance and cannot be re-activated by high-temperature heating. Accordingly, when using the molecular sieves are desiccating agents, the cost is relatively higher than in the case of utilizing other materials.

The adsorption performance of zeolite varies from material to material to be adsorbed; for example, it adsorbs water well but does not equally oxygen. Accordingly, the zeolite adsorbent is effective for gas dehydration but may not work satisfactorily for the removal of oxygen. As a consequence, in the case of purifying a hydrogen gas, use is often made of an adsorbing agent utilizing an expensive palladium film. The palladium film is not only expensive but also poor in mechanical strength and would easily be broken by erroneous temperature control or like operation.

Also in many other technical fields, highly efficient, long-lived, inexpensive adsorbing agents are desired.

In contrast to the removal of small impurities, it is also desired in other fields to reduce the impurity content below a certain level at low cost and with ease; for example, in the cases of purification of oxygen gas for welding use, a foreline trap for water or oil mist is used in a vacuum equipment and in treatment of waste liquid and waste gas in various fields. It is highly desired that these operations neither require excessive human handling nor greater cost. The use of synthetic zeolite adsorbents may often pose problems in their service life, cost and so forth.

As will be appreciated from the above, in the technical fields utilizing the zeolite adsorbents, there is a strong demand for zeolite adsorbents which have higher adsorption performance and longer service life and are less expensive. If properly classsified, natural zeolite would fill such demand.

SUMMARY OF THE INVENTION

It is an object of this invention to provide inexpensive, highly efficient adsorbing agents which employ natural zeolite graded according to impurity content.

Another object of this invention is to provide a method of selecting zeolite for the fabrication of inexpensive and highly efficient adsorbing agents.

Another object of this invention is to provide an impurity removing method using zeolite and apparatus therefor which is capable of effective removal of impurities from a fluid, is strong mechanically and is easy to handle.

Another object of this invention is to provide an inexpensive method and apparatus for removing impurities through utilization of treated natural zeolite.

Yet another object of this invention is to provide a low-temperature adsorption equipment employing natural zeolite which is excellent in adsorption performance, inexpensive and easy of maintenance.

In accordance with one aspect of the present invention, by classifying natural zeolite according to the iron impurity content, it is possible to obtain adsorbents the quality of which is quaranteed. In particular, natural mordenite with small iron impurity content has various advantages of inexpensiveness, large mechanical strength and high heat resistance. Because of high heat resistance, it can be repeatedly re-activated with little deterioration of its adsorption performance.

In accordance with another aspect of the present invention, an adsorbent which consists principally of natural mordenite selected according to the iron impurity content is activated by high-temperature heating and used for the removal of water or like impurities.

In accordance with another aspect of the present invention, oxygen contained in a fluid is reacted with other substances and removed from the fluid. As is well-known, oxygen reacts with hydrogen to yield water. Accordingly, when the removal of oxygen is needed, hydrogen is added to the fluid intentionally for reaction with oxygen and then water is removed. In the case of a gas containing hydrogen, there is no need of adding hydrogen. When it is desired to obtain a gas free of hydrogen, oxygen may be removed by oxidizing another substance, such as porous copper, which strongly reacts with oxygen, and then water is removed by the adsorbents.

In accordance with still another aspect of the present invention, an adsorbent which consists principally of natural mordenite with small iron impurity content is cooled at low temperatures to enhance its adsorption performance and used for the removal of impurities.

DESCRIPTION OF THE PREFERRED EMBODIMENTS

Figure 1:
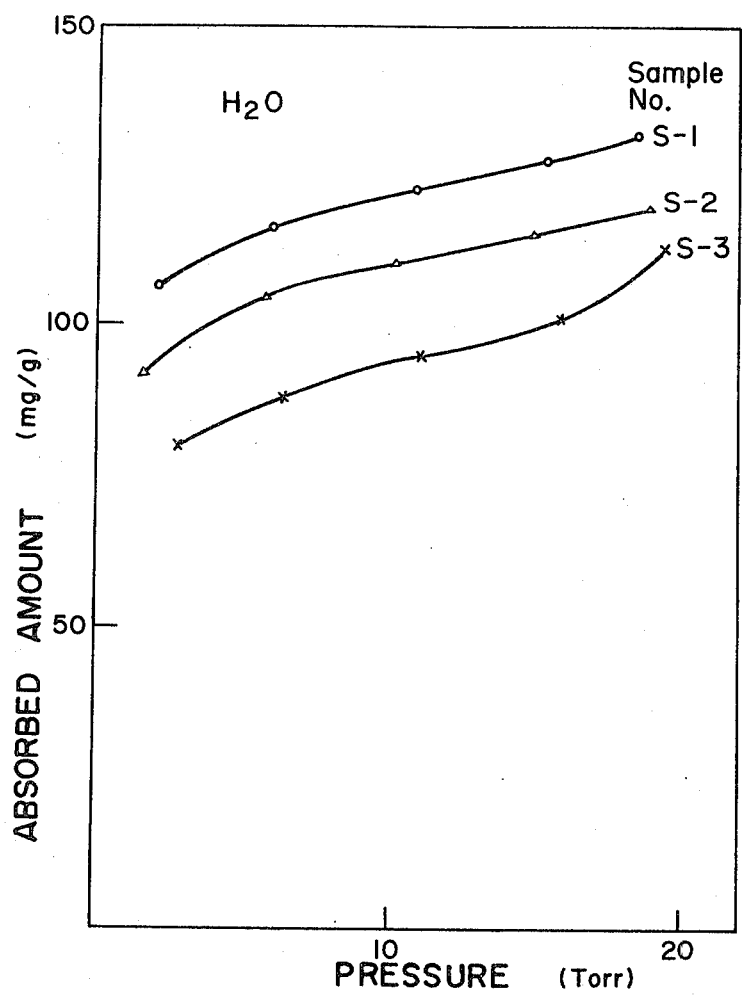
FIGS. 1, 2 and 3 are graphs showing the adsorption performance of adsorbents of the present invention.

With attention given to the iron impurity contained in natural zeolite, the present inventors have studied the relationships between the iron content and the adsorption performance of natural zeolite and, as a result of their study, have found that the adsorption performance of natural zeolite increases with a decrease in the iron impurity content. As natural zeolites, use was made of mordenite and clinoptilolite, but natural mordenite of good quality was easily available and excellent in mechanical strength (durability) when pelletized as adsorbent; hence, the following description will be given with respect to the case of natural mordenite. But, natural clinoptilolite has substantially the same advantages as natural mordenite, and is similar in chemical composition to mordenite, so that if clinoptilolite of good quality could be obtained, then it would be possible to set up a similar criterion for selection.

By classifying natural zeolites on the basis of the iron impurity content, zeolites of constant adsorption performance can be obtained, enabling the production of excellent adsorbents.

Since the classification of natural zeolites according to their iron contents is relatively easy, highly efficient, inexpensive adsorbents can be obtained with the use of such natural zeolites. The aforesaid natural mordenite has a very high mechanical strength when pelletized into agglomerates, so that the agglomerates are not likely to be finely pulverized nor produce fine powders.

Pure zeolite is a white crystal but, when added to an iron oxide, it changes its color to reddish brown. Accordingly, the iron oxide content of zeolite ore can be roughly estimated according to the color of the surface of the ore. By grading the ore into serveral kinds of classes according to the surface color and measuring the mean composition of each class, it is possible to roughly estimate the adsorption performance of the zeolite. The method for classification of ores according to the surface color is well-known.

As zeolite identification methods, X-ray powder diffraction, infrared adsorption spectrum and so on are known, and as composition measuring methods, chemical analysis, emission spectrography, infrared adsorption, Auger spectrum and so on are known. Since the sensitivity for each substance depends on the measuring method used, it is preferred to effect the calibration using a reference sample. For example, as compared with the measured value by quantitative chemical analysis the sensitivity for iron in the emission spectrography is low. With the Auger spectrum method, only the surface of the sample can be measured as is the case with the measurement based on the reflection color from the sample surface, but since $Fe_2O_3$ sensitively presents distinct triplet peaks, this method can be used conveniently according to the purpose. Further, since zeolite minerals are mostly in polycrystalline shape, it is convenient to use a scanning electron microscope or microphotograph for observing the external shape of each grain, that is, the crystal micro-structure.

Now, a description will be given of specific examples of the present invention. Of adsorbents which were prepared by classifying natural mordenites according to the iron content after removing foreign matters adherent to their surface and grinding and pelletizing, the adsorbing performance was measured on each class of adsorbents, especially the following three classes. The $Fe_2O_3$ contents of the individual samples, i.e. the iron content calculated as $Fe_2O_3$, were determined by quantitative chemical analyses according to Japan Industrial Standards.

| Class | Iron Content Converted to $Fe_2O_3$ (wt %) |
|---|---|
| 1 | less than about 0.7 |
| 2 | about 0.7 to about 1.5 |
| 3 | about 1.5 to about 4.0 |

In the case of mordenite ore mined at Shirasawa, Miyagi Prefecture, Japan, samples of Classes 1, 2 and 3 amounted to about 10% of all the ores.

The mordenite adsorbents manufactured as described above were examined for their water, $CH_4$ gas, $N_2$ gas, $O_2$ gas, Ar gas, CO gas, $CO_2$ gas, $NH_3$ gas and $SO_2$ gas adsorbing capabilities.

The examination results revealed that the adsorbent of class 1 is superior in each adsorption performance to all of the other adsorbents put to the tests. In particular, for the $N_2$, $O_2$, $CH_4$ and CO gases, the adsorbent of class 1 exhibited adsorption performance equal to or better than a commercially available synthetic mordenite (by Norton Inc., U.S.A.) or molecular sieve 5A.

The adsorption performance of the adsorbent of class 2 was midway between the adsorbents of classes 1 and 3, but, in its limited application, this adsorbent was sufficiently more effective than the synthetic mordenite.

The adsorbent of class 3 was inferior in adsorption performance to the adsorbent of classes 1 and 2, but, according to the application, it exhibited adsorption performance equal to or more than that of the synthetic molecular sieves; furthermore, this adsorbent is attractively low in its manufacturing cost and hence is of much industrial value.

Further, it has been found that for some particular uses, natural mordenites with iron contents in the range of about 4 to about 10 wt% are still of sufficient utility as adsorbents when employed for some low grade purposes.

A detailed description will hereinafter be given, with reference to FIGS. 1 to 3, of the adsorption performance of the adsorbents for some particular gases. In each of FIGS. 1 to 3, the abscissa represents the pressure in an adsorption chamber and the ordinate represents, in mg/g, the weight of a gas adsorbed per one gram of the sample. The samples were put to adsorption tests after activation at approximately 350° C.

FIG. 1 shows the adsorption performance of the mordenite adsorbents of classes 1, 2 and 3 for $H_2O$. The amounts of $H_2O$ adsorbed by the mordenite adsorbents of classes 2 and 3 respectively amount to about 90% and about 80% of the amount of $H_2O$ adsorbed by the mordenite adsorbent of class 1. It is evident from FIG. 1 that the mordenite adsorbents exhibit excellent performance for adsorption of $H_2O$ in the low-pressure region. Further, the adsorption performance of the natural mordenite is enhanced by repeated activation. The dew point of a gas dehydrated by an ordinary molecular sieve was only $-70°$ C.; but, it has been found that the dew point of a gas dehydrated by the natural mordenite of class 1 activated by sufficient pretreatment can be as low as below $-196°$ C. Moreover, it will be appreciated from FIG. 1 that the natural mordenites of classes 2 and 3 are inferior to the natural mordenite of class 1 but are still of sufficient utility value. As described above, the water adsorption ability of the high-grade natural mordenite is equal to or better than that of ordinary molecular sieves.

Figure 2:
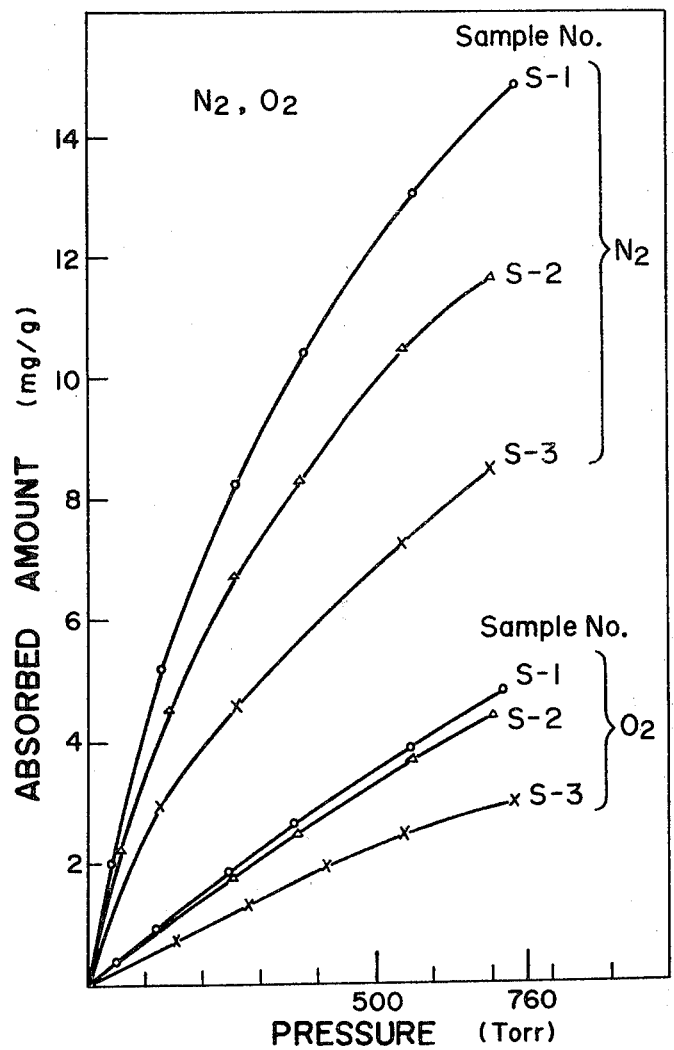

FIG. 2 shows the adsorption performance of the mordenites of classes 1 to 3 for $N_2$ and $O_2$. It appears from FIG. 2 that for both of $N_2$ and $O_2$, the mordenite of class 1 has far more excellent adsorption performance than the molecular sieve 5A. Further, the mordenite of class 2 is also superior to the molecular sieve 5A. The adsorption tests were conducted on samples subjected to chemical treatment with NaCl.

Figure 3:
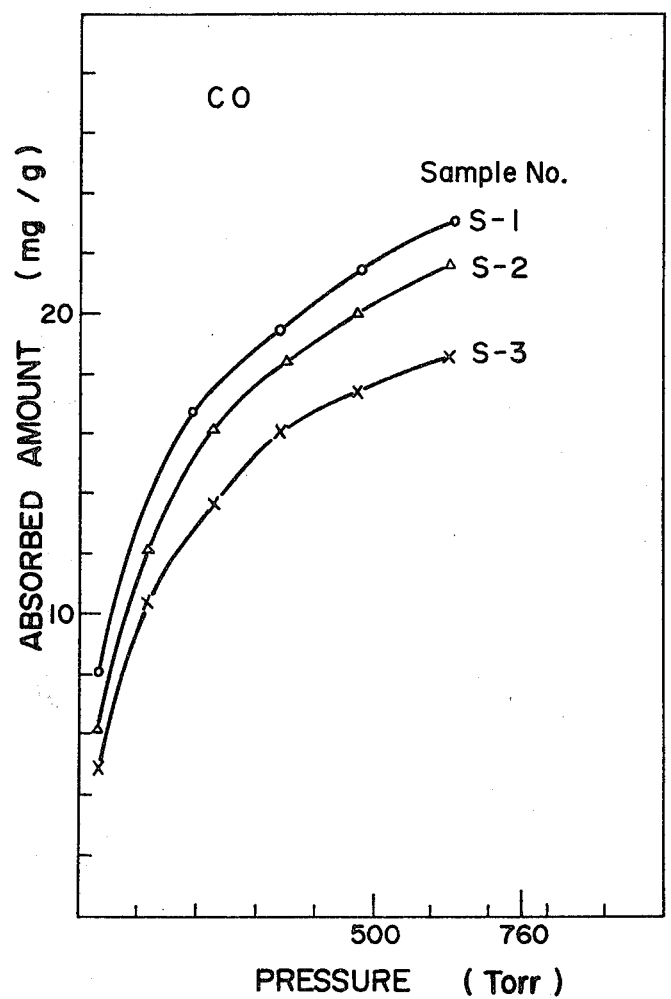

FIG. 3 shows the adsorption performance of the mordenites of classes 1 to 3 for CO which is a typical poisonous gas. As seen from FIG. 3, the adsorption performance of the natural mordenites is very high, as compared with the adsorption performance of the molecular sieve 5A. In the low-pressure region, even the mordenite of class 3 presents outstanding adsorption performance, and it will be appreciated that the natural zeolite containing less than about 10 wt% of iron (converted in terms of $Fe_2O_3$) also achieves an adsorptive activity comparable to that of the molecular sieves.

As to other gases, the mordenites of classes 1, 2 and 3 were found to be inferior to the molecular sieve 5A e.g. with respect to $CO_2$. However the mordenite of class 1 even has presented such an adsorption capacity as to be sufficiently acceptable for industrial use.

With respect to methane, all of the treated mordenites displayed prominent adsorption performance, and the adsorption capacities of the mordenites of classes 2 and 3 respectively amounted to approximately 85% and 70% of the adsorption capacity of the mordenite of class 1. Taking advantage of their high mechanical strength, the natural mordenites can thus be employed for the purification of methane. Also in respect of $Cl_2$, $NH_3$, $SO_x$, $NO_x$ and so forth, the mordenites achieved such a high adsorption performance that they could be employed for industrial purposes. Hence, these mordenites can readily be employed for the prevention of environmental pollution and for other purposes.

In the case of Ar, the mordenites presented substantially the same adsorption performance as for $O_2$.

As described above, it has been found that the adsorbents made from natural mordenite in accordance with the present invention have very excellent adsorption performance.

The mean composition of the natural mordenites used was $0.265\ Na_2O.bK_2O.cCaO.Al_2O_3.9.98\ SiO_2.xH_2O$ according to quantitative chemical analysis, whereas the mean composition of the synthetic mordenites (by Norton, Inc., U.S.A.) was $0.94\ NaO_2.Al_2O_3.10.36\ SiO_2.yH_2O$. In the Auger spectra of other samples, a peak of CaO appeared clearly, but substantially no peak of $Na_2O$ appeared. The relationship between the principal composition and the adsorption performance of natural mordenite is still unknown in many points. An examination of the adsorption performance on the basis of the content of iron or iron oxide, which is not a constituent of zeolite, provided orderly results. That is, the adsorption performance increases with a decrease in the iron content.

The abovesaid relationship between the adsorption performance and the iron content was proved most clearly in respect of natural mordenite; but, it is considered that such relationship could also be established in natural clinoptilolite which is similar in property and chemical composition to the natural mordenite. Further, it is considered that such relationship is also established in natural zeolite which has a high Si/Al ratio and is substantially equal in chemical composition to the natural mordenite.

The re-activation can be effected not only in a hydrogen, nitrogen or like gas stream but also in vacuo. In the case where the amount of gas required for re-activation is relatively large, it is preferred to carry out the re-activation in a vacuum. Further, since mordenite and clinoptilolite do not undergo any change in their crystal structure below 600° C. or so and can be practically heated up to about 900° C., their re-activation is preferred to take place at high temperatures. Accordingly, it is desirable to form an adsorption chamber using a metal of high heat resistance and airtightness such as stainless steel or the like. The kind of metal or the kind of stainless steel used must be selected in consideration of the kind of gas to be treated, the temperature used for the re-activation and so forth.

When the zeolite is used as an adsorbent, bulky or powdery shape is undesirable from the standpoints of easy handling, wide surface area and prevention of mixing of the zeolite into the material being treated, but it is preferred that the adsorbent take the granular form having a certain degree of mechanical strength. The term "granular" means that the adsorbent particles have such a size that they are not easily suspended or scattered in a weak gas or liquid stream. The shape of each particle may be columnar, pyramidal, rice-grain-like, spherical and so on. To make the zeolite material in such a granular form is called pelletization, and for the pelletization of zeolite, a binder such as bentonite or the like is usually employed. But it is desirable that no binder be used, if possible. Even if a binder is used, some kinds of zeolites are difficult to pelletize due to their lack of mechanical strength. It is preferred that the grains of the adsorbent retain their shapes and do not become pulverized while the adsorbent is used. It has been found that the natural mordenite has a very high degree of mechanical strength after pelletization and that the pelletized form is not changed by a long use.

For a clarification of its cause, microscopic external shapes of various natural zeolites were observed by scanning electron microphotograph. As a result of this, it has been found that the natural mordenites are mostly composed of slender, fibrous crystals and that although their cross-sectional configurations are unknown, fibrous crystals are less than about $0.5\mu$ and mostly around $0.2\mu$ in diameter, $2\mu$ or more in length; and some of them have a length of $10\mu$ or more.

The natural clinoptilolite of low mechanical strength contained plate-shaped crystals in quantities, and the plate-shaped crystals were square or deformed hexagonal ones 1 to 4 $\mu m$ in thickness and 5 to 15 $\mu m$ in diameter. It has been found that the natural zeolites have various forms other than the abovesaid ones and that they are produced in the form of a mixture of several kinds of forms in many cases.

The pellet-shape-retaining capabilities of zeolites of various forms, pelletized using bentonite as a binder, were examined. The examination revealed that the adsorbent made of the zeolite consisting principally of the plate-shaped crystals is brittle and liable to lose its pelletized form and become powdered in a relatively short time of use, whereas the adsorbent made of the zeolite consisting principally of the fibrous crystals is strong mechanically and retains the pelletized form and is hardly powdered when used for a long time.

Consequently, in the case of obtaining an adsorbent of high mechanical strength, it is preferred to use the mordenite having the fibrous crystal shapes. For example, a natural mordenite and clinoptilolite of substantially the same adsorption performance may be mixed together in a proper ratio.

Figure 4A:
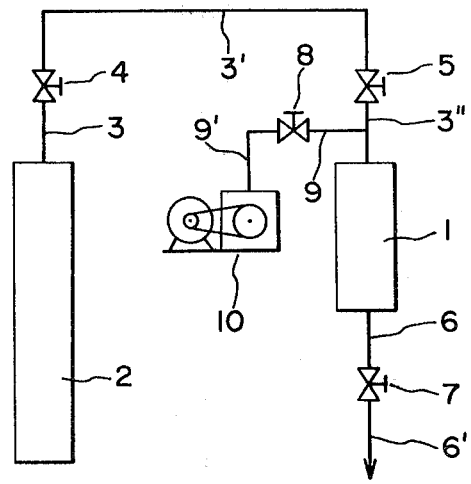
FIGS. 4A and 4B are schematic diagrams illustrating impurity adsorption equipments for purifying as in accordance with two embodiments of this invention.
Figure 4B:
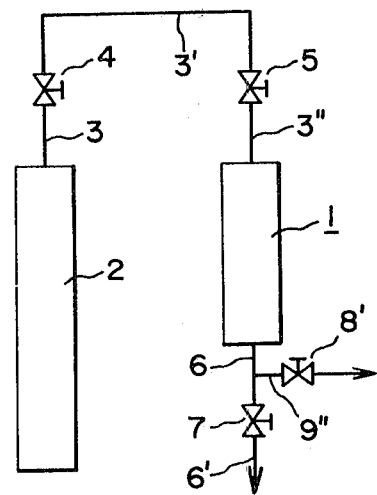

FIGS. 4A and 4B respectively illustrate arrangements of hydrogen gas and inert gas purification equipments.

In FIG. 4A, a raw or source gas supplied from a gas vessel 2 is led to an impurity adsorption chamber 1 through pipes 3, 3' and 3" and valves 4 and 5. A purified gas free from impurities is supplied to a desired place through pipes 6 and 6' and a valve 7. On the inlet side of the impurity adsorption chamber 1 there is provided a path for re-activation. That is, a vacuum pump 10 is connected to the pipe 3" via pipes 9 and 9' and a valve 8. The path for re-activation may also be provided on the outlet side of the adsorption chamber 1. In the adsorption chamber 1, an adsorbent produced by pelletizing the natural mordenite with small iron content is placed for adsorbing impurities contained in the raw gas. When the adsorption performance of the adsorbent has sufficiently diminished, the adsorption chamber 1 is disconnected by closing the valves 5 and 7 from the pipes 3' and 6' and is then connected by opening the valve 8 to the vacuum pump 10, after which the adsorption chamber 1 is evacuated with the vacuum pump 10 while at the same time heating the adsorbent for its re-activation. It will be obvious to those skilled in the art that a pressure gauge, a flowmeter, a dew point meter and so forth may be provided in the gas passage at desired places. Of the impurities which are adsorbed by the adsorbent and released therefrom during re-activation, water is the largest in amount in many cases, so that a water trap may also be provided in the passage for re-activation. Also, it is possible to provide an auxiliary adsorption chamber in the re-activation passage for trapping water and the like and for preventing oil of the vacuum pump 10 from entering into the adsorption chamber 1.

FIG. 4B illustrates the arrangement for re-activating the adsorbent by flowing a purge gas therethrough, without using the vacuum equipment. In this case, the purge outlet of re-activation passage is provided on the outlet side of the adsorption chamber. That is, a passage 9" is branched from the outlet of the adsorption chamber 1, and the purge gas can be drained out through a valve 8'. This arrangement is identical in construction with the arrangement of FIG. 4A in the other parts. The purge gas may be the same as the crude gas or different therefrom. FIG. 4B shows the case of purging the adsorbent with the crude gas. When the adsorption performance of the adsorbent has sufficiently diminished, the valve 7 is closed and the valve 8 is opened and then the adsorbent is heated. As the purge gas, a nitrogen, hydrogen or like gas can be used.

It is possible, of course, to combine the arrangements of FIGS. 4A and 4B. For example, in the first period of re-activation the purge gas is employed, and after a considerable amount of water and other impurities has released from the adsorbent, vacuum re-activation may be carried out.

When a He gas of 6 N (99.9999%) was purified by the employment of the purification equipment of FIG. 4B, the CO concentration decreased from about 100 ppm to less than 1 ppm, the $CO_2$ concentration from about 2 ppm to less than 0.1 ppm and the $CH_4$ concentration from 4.5 ppm to less than 0.1 ppm. The highest temperatures at which these impurities could be adsorbed, that is, the critical adsorption temperatures were 100° to 150° C. for CO, 150° to 200° C. for $CO_2$ and 25° to 40° C. for $CH_4$.

Where a hydrogen gas was dehydrated by a synthetic molecular sieve adsorbent, the $H_2O$ concentration was about 7 ppm, but when the hydrogen gas was dehydrated by the natural mordenite adsorbent described above, the $H_2O$ concentration was reduced to approximately 2 ppm.

Figure 5:
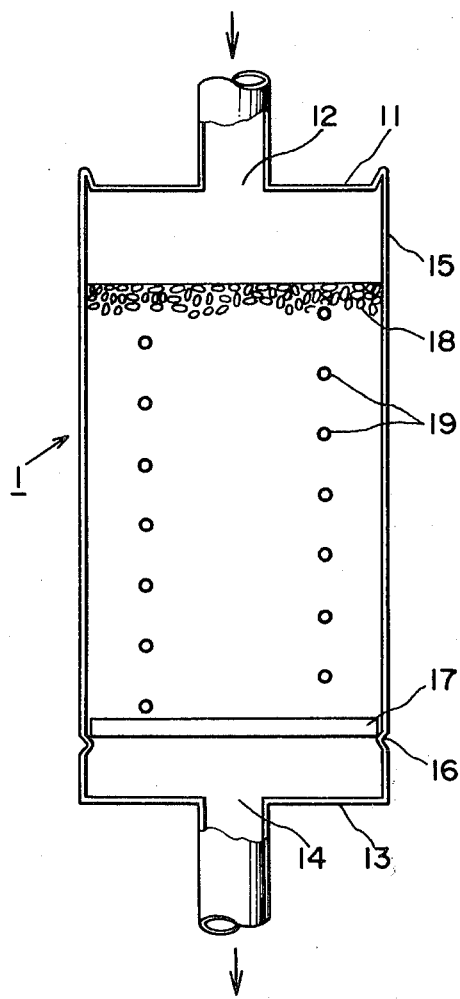
FIG. 5 is a schematic diagram, partly cut away, showing an example of the structure of an adsorption chamber for use in the adsorption equipments shown in FIGS. 4A and 4B.

FIG. 5 illustrates in section the construction of an example of the adsorption chamber 1, which is cylindrical and has a gas inlet 12 formed in its top plate 11 and a gas outlet 14 in its bottom plate 13. The cylindrical side wall 15 has an inwardly projecting seat 16 for holding a support screen 17 for adsorbent pellets 18. A heater 19 is disposed so as to be buried in the adsorbent pellets 18 for heating them during re-activation. The adsorbent 18 may be loaded in the adsorption chamber 1 before the side wall 15 and the top plate 11 are sealed together or after the sealing through the inlet 12. The top plate 11, the side wall 15, the bottom plate 13, the support screen 16 and the sheath of the heater 19 are preferably made of stainless steel. The configuration of the adsorption chamber 1 is not always limited specifically to cylindrical but may also be of any other configuration so long as it assures that the gas introduced from the gas inlet uniformly and sufficiently makes contact with the surface of the adsorbent before it is exhausted from the gas outlet. The heater 19 may also be wound on the outside of the side wall 15 provided that it can heat the adsorbent uniformly up to a predetermined temperature during re-activation.

The grain size of the adsorbent pellets 18 is selected so that it is easy to handle and strong mechanically. The adsorbent is pelletized into, for example, columnar grains about 1 to 5 mm in diameter and about 1 to 10 mm in length. Of course, the grains may also be in any other forms.

Figure 6:
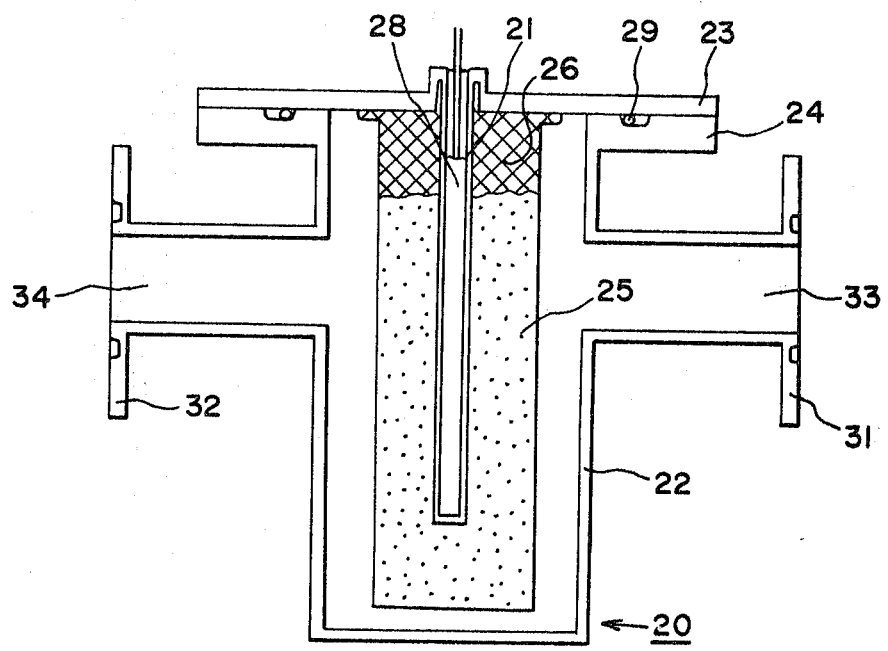
FIG. 6 is a cross-sectional view illustrating an impurity removing equipment for use in a vacuum system in accordance with another embodiment of this invention.

FIG. 6 illustrates, by way of example, an impurity removing equipment for use in a vacuum system. An adsorption chamber 20 comprises an inner cylinder 21, an outer cylinder 22, flanges 23 and 24 and an O-ring 29 and forms a vacuum vessel. These members except the O-ring are preferably formed of SUS 304 stainless steel or the like. An adsorbent 25, which consists principally of natural mordenite containing less than about 0.2 by weight of iron converted in terms of $Fe_2O_3$, is held on a net 26 in the adsorption chamber 20. In an upper portion of the net 26 there is formed a window for loading the adsorbent, though not shown, and the net 26 can be removed from the flange 23. Inserted into the inner cylinder 21 is a heater 28. The inner cylinder 21 is formed of thin stainless steel, and the upper end portion of the inner cylinder 21 is connected with the flange 23 through an upwardly projecting dual cylinder portion as shown in the figure, thereby to prevent excessive heating of the flange 23 and so on. By cooling the O-ring 29 with water or replacing it with a metal seal, the heat resistivity of the equipment is enhanced.

The adsorption chamber 20 has an inlet 33 and an outlet 34 which are connected to the outside with flanges 31 and 32, respectively. The inlet 33 and the outlet 34 are respectively connected to a low vacuum side and a high vacuum side, and the adsorption chamber 20 is so arranged as to be evacuated from either one of the two sides. For example, the inlet 33 may be connected via a valve to a vacuum vessel and the outlet 34 may be connected to a vacuum pump.

Such impurities as water, metal mist and the like in the vacuum vessel or oil mist flowing backward from the vacuum pump are adsorbed by the adsorbent, by which cleaner vacuum system results or cleaner gas than obtainable in the case of using the vacuum pump alone can be obtained, and dehydration can be achieved more sufficiently in a short time. In ordinary evacuations, a primary cause of prolonging the evacuation period is water adsorbed on the surface of the vacuum vessel, so that the time for attaining a predetermined vacuum can also be reduced by the combined use of such an impurity removing equipment and the vacuum pump. For the removal of a very small amount of water in a low pressure state, the use of such an impurity removing equipment is particularly effective. Where it is desired to enhance the water removing performance of a vacuum equipment including a diffusion pump and a rotary pump, and if such an impurity removing equipment is provided on the higher vacuum side of the diffusion pump, then water and like impurities which are otherwise led into the vacuum pump are preferentially adsorbed and hence removed thereat.

When the adsorption equipment as shown in FIG. 6 was incorporated as a foreline trap in a system it included a rotary pump of a rating of the highest degree of vacuum of $1\times 10^{-3}$ mmHg and a vacuum vessel to be evacuated. The system attained a vacuum of about $1\times 10^{-2}$ mmHg without the foreline trap and when the foreline trap was installed and used during re-activation at about 300° C., the highest vacuum rose to about $5\times 10^{-3}$ mmHg.

It is also possible to provide an adsorption chamber in the vacuum vessel for adsorbing water vapor. In this case, the adsorbent is preferably replaceable with a new one and reactivated outside the adsorption chamber. This ensures to prevent re-adsorption of water on the vacuum vessel and permits simplification of the overall structure.

The re-activation in the adsorption equipment of FIG. 6 is performed as follows: After the vacuum vessel and the adsorption chamber 20 are disconnected by a valve, the adsorbent 25 is heated by the heater 28, for example, up to 300° to 500° C. while evacuating the adsorption chamber 20 by a vacuum pump. As a consequence, water and other impurities adsorbed on the adsorbent 25 are outgassed, resulting in the adsorbent 25 being activated. A heating time, though different with the amounts of impurities adsorbed and according to the use, of 20 to 60 minutes is usually sufficient for re-activation.

An impurity removing equipment using a natural mordenite adsorbent with small iron impurity content is particularly effective for dehydration but additionally adsorbs other impurities, too. For example, when a foul odor gas fine powders of heavy metal and so on enter into the equipment, they are also trapped, i.e. their adsorbable impurities are adsorbed by such adsorbent.

The mordenite can be heated safely up to at least 600° C. and may be heated up to 900° C. The re-activating temperature is preferebly as high as possible and near 600° C. because the time for activation is reduced and because the performance after activation is high. In the case of a vacuum vessel, however, if the heating temperature is raised, then radiating means, water-cooling means, a metal gasket and other additional members are required when the equipment is compact; therefore, it is preferred to select a heating temperature as high as possible within the range in which the equipment does not become too complicated. In small- and medium-sized equipments, heating temperatures ranging from 300° to 500° C. can be achieved easily without requiring any special structures.

In the case where it is desired to avoid heating the surroundings, the heating temperature for re-activation may be lowered, but preferably above 250° C. or so.

In the purification of gas, it is often desired to minimize the oxygen content, although the activity of natural zeolites to oxgen is relatively low, as shown in FIG. 2. Even when oxygen can not be sufficiently removed with the use of only natural zeolite adsorbent, a desired degree of deoxidization can nevertheless be obtained by combining auxiliary oxygen-removing means with the adsorbent.

Figure 7:
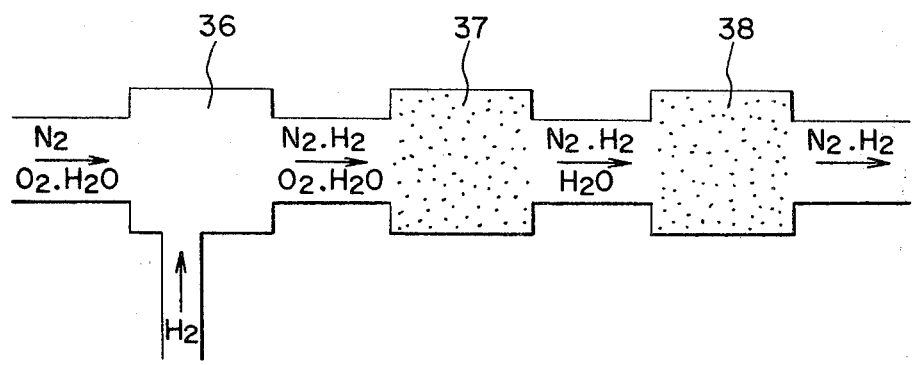
FIGS. 7, 8 and 9 are schematic diagrams illustrating gas purifying equipments in accordance with three other embodiments of this invention.

FIG. 7 schematically illustrates, by way of example, an arrangement for obtaining a nitrogen or inert gas which may contain a very small amount of hydrogen but must be free of oxygen and water. The following description will be given to illustrate nitrogen gas. The nitrogen gas from a nitrogen gas vessel is led to an agitation or mixing chamber 36, wherein it is added to an amount of hydrogen gas and well mixed together. This mixture gas contains $N_2$, $H_2$ and $H_2O$ and $O_2$ which last two are impurities. The mixture gas is then led to a reaction chamber 37, wherein oxygen and hydrogen are allowed to react with each other to form water. The gas which has thus removed therefrom the oxygen by sufficient reaction and has had a composition $N_2+H_2+H_2O$ is supplied to a water adsorption chamber 38, wherein $H_2O$ is removed. The composition of the gas derived from the outlet of the adsorption chamber is $N_2+H_2$; thus harmful $O_2$ and $H_2O$ are removed.

The agitation chamber 36 is preferably equipped with spiral or like fluid agitating means so that the gas stream becomes a turbulent flow, not a laminar flow. The $H_2$ must be added in such a quantity that the $O_2$ contained in the gas is entirely converted into water; it is preferred that the amount of $H_2$ added be more than four times as large as the maximum content of $O_2$ in terms of molar ratio.

The reaction chamber 37 is filled with a catalyst which accelerates the reaction $2H_2+O_2\rightarrow 2H_2O$, and it is desirable to accelerate the reaction by heating, if possible. As the catalyst, use is made of a zeolite, alumina or silica system substance carrying an active catalyst metal (Pt system or the like). The adsorption chamber 38 has, for example, such construction as shown in FIG. 5 and is filled with a zeolite adsorbent of high water adsorption performance. As the zeolite, use is made of a natural zeolite which has a small iron content and a high Si/Al ratio, as described previously. In terms of its adsorption performance, cost and re-activation capability, such high-grade natural zeolite with small iron content and high Si/Al ratio is superior to the synthetic zeolite.

Figure 8:
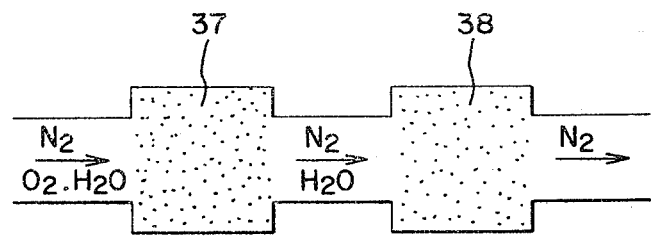

FIG. 8 shows, by way of example, an arrangement for obtaining a nitrogen or inert gas free from hydrogen gas. In this case, no hydrogen is added, and consequently no agitation chamber is provided.

In a reaction chamber 37 there is filled an oxidizable catalyst which is readily oxidized and has a large specific surface area, such as porous copper and fibrous copper. By heating the oxidizable catalyst, the oxygen removing ratio is further enhanced. Even if a high-temperature gas flows in the gas adsorption chamber 38, harm by high temperatures is prevented by using, as the adsorbent, the natural zeolite with high Si/Al ratio. In this case, it is preferred to cool the adsorption chamber to prevent unnecessary heating of the adsorbent. By high-temperature treatment in a hydrogen gas flow, the catalyst and the adsorbent can be reactivated. It will be noted that re-activation of adsorbent in vacuum is not appropriate for this system.

The arrangement of FIG. 8 can also be employed for obtaining a nitrogen gas in which a hydrogen gas may be contained. With a small amount of hydrogen added to the crude nitrogen gas, the oxygen removing power is further enhanced. It is also possible, of course, to combine the arrangements of FIGS. 7 and 8.

Figure 9:
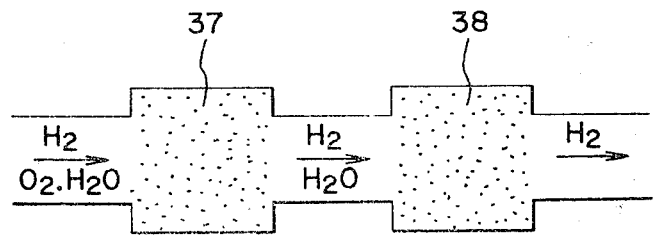

Turning next to FIG. 9, a description will be given of the removal of impurities in a hydrogen gas. Since oxygen in the hydrogen gas can be converted into water by reaction with hydrogen, the impurities in the hydrogen gas can be removed by accelerating the reaction by a catalyst described in connection with FIG. 7 and then adsorbing water and other impurities by the adsorbent. Accordingly, the hydrogen gas purification equipment may include only a reaction chamber 37 for the reaction $2H_2+O_2\rightarrow 2H_2O$ and an adsorption chamber 38 for adsorbing water and other impurities, as shown in FIG. 9. The reaction chamber 37 is filled with a reaction accelerating catalyst having a platinum metal system carried by zeolite (or alumina) as described in respect to FIG. 7. With this kind of catalyst, oxygen contained in the hydrogen on the order of ppm can mostly be converted to water. The adsorbent filled in the adsorption chamber 38 is at least partially comprised of natural mordenite with small iron impurity content. This adsorbent is advantageous in that it is high in adsorption performance and in mechanical strength and does not generate fine powders and/or impurities. As adsorbent, use is made of a natural mordenite adsorbent containing less than 0.7% by weight of iron converted in terms of $Fe_2O_3$.

The dew point of hydrogen purified by using the hydrogen purification equipment of FIG. 9 at room temperature was reduced even below the liquid nitrogen temperature. According to the results of experiments conducted on such hydrogen in the manufacture of semiconductor devices, it was found that the oxygen concentration was very low and the quality of hydrogen was higher than that of hydrogen purified by the use of a palladium film. For example, excellent results were obtained by a commercial type test system using "DEOXO" catalyst available from Engelhard Inc. (U.S.A.) which induces reaction of oxygen with hydrogen to form water vapor in combination with the natural mordenite adsorbent having an average iron impurity content of 0.5 wt% based on $Fe_2O_3$. When the input hydrogen pressure was 5 atm, the output hydrogen pressure was 1 atm and the flow rate was 10 normal liters/minute. The catalyst was heated and the adsorbent was kept below 30° C. The source hydrogen gas contained about 0.95 ppm oxygen and the purified hydrogen gas contained about 0.014 ppm oxygen. The dew point could not be measured by a meter which can measure the dew point down to $-74°$ C. It will be apparent that the oxygen content and the dew point are sufficiently low for usual usages.

As compared with the hydrogen purification equipment employing the palladium film, the equipment of FIG. 9 has the advantages that the flow rate can be changed over a wide range, that the maximum flow rate can be increased, the possibility of the equipment breaking down is n:1 and the maintenance and operating costs are low.

In the case of continuously using purified gas, two (or more) such purification sub-systems may be assembled: one sub-system performs the re-activation while the other is in operation. It is also possible to integrate the heating means for heating the catalyst and the adsorbent for re-activation or to take out the catalyst and the adsorbent from the purification systems for reactivation. Also, such an arrangement may be made that the adsorbent is easily replacable in the form of a cassette or the like in the case where the crude gas contains substantial quantities of metal or like impurities which are difficult to remove from the adsorbent. It is also possible to carry the catalyst on part of the adsorbent and form the reaction chamber and the adsorption chamber into a simple unitary structure. For higher removing ratios, it is effective to heat the catalyst up to high temperatures and cool the adsorbent.

It is known that when cooled down to low temperatures, the zeolite or like adsorbent can capture even those molecules that cannot be captured at room temperature. As an equipment positively using such property, a sorption pump or cryosorption pump is known.

The sorption pump has the functions of a pump and a trap and is sometimes called trump or puap. Molecular sieves 5A and 13X and active carbon are used as adsorbents of such sorption pumps. It is known that when cooled down to under 20° K., the molecular sieve can also capture helium, hydrogen, neon and so forth. By cooling the zeolite adsorbent down to such low temperatures, its adsorption performance is markedly increased.

In a vacuum equipment having a combination of an ordinary mechanical pump and a diffusion pump, if oil flowing backward from the mechanical pump enters into the diffusion pump, the vacuum system or gas will be contaminated. It is also known that the provision of the sorption pump midway between the mechanical pump and the diffusion pump for the purpose of such contamination is effective for providing a clean vacuum system or gas.

Incidentally, the molecular sieve is a synthetic, artificial zeolite and has such shortcomings that its manufacturing cost is relatively high and its heat resistance and acid resistance are low so as to impose limitations on the number of re-activation times. The synthetic mordenite is excellent in heat and in acid resistance but is low in mechanical strength and is expensive.

If there is available an adsorbent which does not become a source of impurities and is excellent in adsorption performance and is able to be re-activated a number of times, the low-temperature adsorption equipment can be expected to be used as a vacuum equipment and a gas purification equipment more widely.

Figure 10:
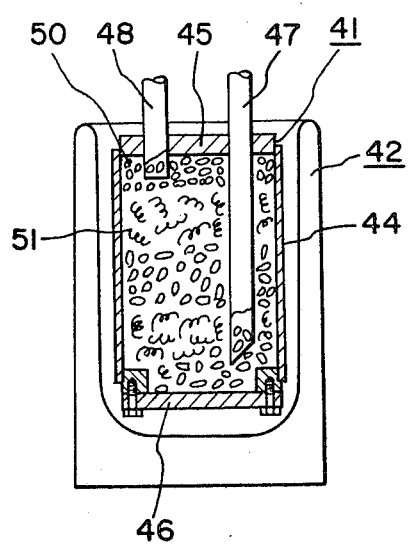
FIG. 10 is a cross-sectional view showing a low-temperature adsorption equipment in accordance with another embodiment of this invention.

FIG. 10 illustrates a sorption pump (trap) which is suitable to be disposed on the suction side (the higher vacuum side) of a mechanical pump. This equipment can also be employed as a gas purification equipment with substantially no modifications.

An adsorption equipment 41 is constructed so that it can be cooled down to the liquid nitrogen temperature from the outside by a low-temperature Dewar 42 containing liquid nitrogen. The adsorption chamber 41 has an outer cylinder 44, a top plate 45, a bottom plate 46 and gas inlet and outlet pipes 47 and 48 which are made from stainless steel. The outer cylinder 44 and the bottom plate 46 are fixed together using an aluminum-foil gasket to form a hermetic vessel. In this hermetic vessel, an adsorbent 50 using natural zeolite with small iron content and a copper wool 51 of good heat conduction are filled in alternate layers. As a gas inlet, either the pipe 47 or 48 may be used, but one of them has an opening at an upper portion and the other has an opening at a lower portion of the chamber in a manner to ensure that a gas flowing from the inlet to the outlet flows in contact with as great a surface of the adsorbent 50 as possible. Where the level of the coolant varies, it is preferred that the substances to be removed enter from the side of the pipe 48 which has the opening at an upper portion. For example, in the case of adsorbing oil flowing backward from the mechanical pump, the pipe 48 is preferably connected to the mechanical pump and the pipe 47 to the vessel to be evacuated. In the case of removing by adsorption a poisonous gas or gases generated from the vacuum vessel, the connections of the pipes are reversed. The copper wool 51 is employed for cooling the natural zeolite adsorbent efficiently as a whole in the vessel. According to the gas to be purified and the impurities contained therein, the copper wool may be replaced with some other material of good thermal conductivity. Where the vessel is not too large, the copper wool 51 may also be omitted. According to the application, a coolant other than the liquid nitrogen may be employed.

Figure 11:
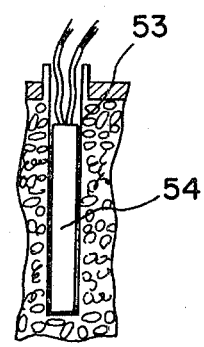
FIG. 11 is a cross-sectional view showing a heating unit for use in the adsorption equipment of FIG. 10.

For repeated re-activation of the adsorbent, an inner housing may be provided which defines a cylindrical space extending down from the central part of the top plate of the vessel and a heater 54 is inserted in the housing 53, as depicted in FIG. 11. Since the housing 53 is subjected to pressure application from inside when used in a vacuum system, it may be formed of a thin metal and yet can provide a high mechanical strength. The heating temperature for re-activation is desirably in the range of 300° to 600° C. Generally, the higher the heating temperature for re-activation is, the more efficiently the re-activation takes place. Heating temperatures above 600° C., however, introduce the possibility of the natural zeolite of the adsorbent being deteriorated. If the deterioration of the zeolite is negligible to some extent, the heating temperature can be raised up to 900° C. When heating the adsorbent above 700° C., it is preferred to replace the aluminum-foil gasket with a copper-foil gasket. For preventing oxidation of the outer surface of the vessel, it is desirable to flow an inert gas or use a heat-resisting, rust-proof alloy.

Figure 12:
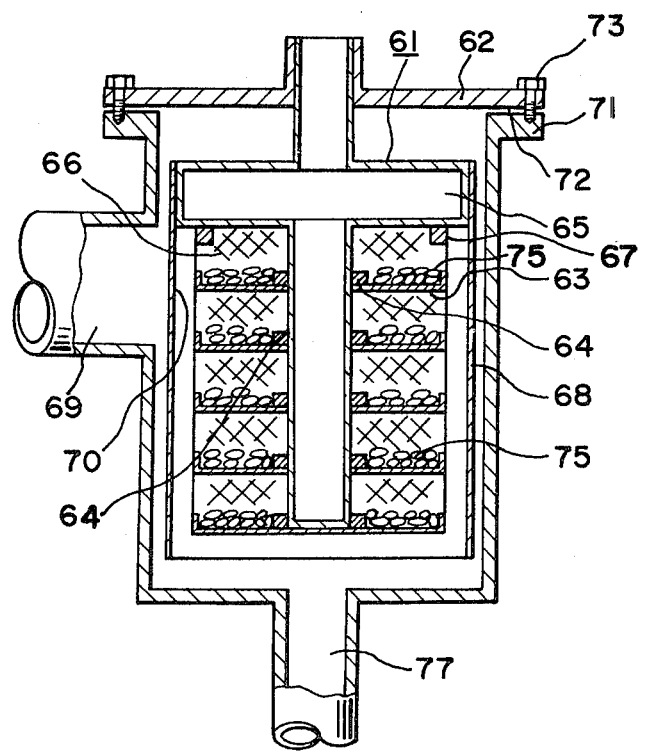
FIG. 12 is a cross-sectional view illustrating a low-temperature adsorption equipment in accordance with another embodiment of this invention.

The equipments of FIGS. 10 and 11 can be used only in the pressure range in which a gas flows as a viscous flow. In FIG. 12 there is shown a low-temperature adsorption equipment which operates well even below such pressure range.

In FIG. 12, a liquid nitrogen container 61 is formed as a unitary structure with an upper flange 62 and is provided below the level of a central liquid nitrogen container 65, with supports 64 for supporting adsorbent receptacles 63 and a support 67 for mounting a wire net 66 for preventing the adsorbent from falling down. The adsorbent receptacles 63 which are each composed of two semicircular parts are formed of a metal of high thermal conductivity, such as copper or the like, and are secured by screws (not shown) to the support 64. As the wire net 66, use is made of wire mesh that does not deteriorate the conductance of the gas but is capable of preventing the adsorbent from falling down. On the outside of the wire net 66, a cylindrical heat or radiation shielding plate 68 of high reflectivity and good thermal conductivity is mounted on the outside of the central part of the liquid nitrogen container 65. The heat shielding plate 68 has an opening 70 facing an evacuating port 69. The upper and lower flanges 62 and 71 are fixedly assembled by bolts 73 with an aluminum-foil gasket 72 interposed therebetween, forming a hermetic seal.

On each of the receptacles, there is mounted a natural mordenite adsorbent 75 with small iron content (for example, less than about 0.5 wt% of iron in terms of $Fe_2O_3$). An exhaust port 77 is connected to a diffusion pump or the like for exhaustion.

According to the present embodiment, since the adsorbent 75 is placed on the receptacles of good thermal conduction and makes contact with free spaces of the same number as the receptacles, it is capable of capturing efficiently gas molecules impinging thereon. Furthermore, the adsorbent consists principally of natural mordenite of high adsorption performance and with very small iron impurity content, so that the amount of impurities adsorbed per unit area is also large. Such high adsorption performance, coupled with the above said effect, provides a clean, high vacuum system or gas. When the adsorbent is to be re-activated, a heater may be inserted into the liquid nitrogen container 61 to heat the adsorbent 75 up to 300° to 600° C. and, at the same time, evacuation is effected. It is also effective to dispose two such low-temperature equipments of FIG. 12 in parallel between the vacuum vessel and the diffusion pump. In this case, re-activation may be carried out in one of the limits while at the same time evacuating the vacuum vessel in the other unit to a given vacuum, and then the latter unit may be disconnected from the vacuum vessel which is further evacuated to high vacuum only by the adsorption equipment having just finished re-activation or by the combination of this one unit and the diffusion pump. Also, it is possible to dispose between the diffusion pump and the mechanical pump such adsorption equipment as shown in FIG. 10.

As it has been described in the foregoing, the low-temperature adsorption equipments of FIGS. 10 and 12 employ the absorbent consisting principally of natural zeolite with small iron impurity content and allow the adsorbent to efficiently absorb impurities by cooling the adsorbent to low temperatures. For efficient cooling of the adsorbent to low temperatures, an adsorbent support member is formed of a material of good thermal conductivity, and for use in the high vacuum region in which gas does not behave as a viscous flow, use is made of such a structure which enlarges the adsorbent surface exposed to free space, thereby increasing the sum of conductances from the adsorbent to the vacuum space.

As a consequence, a clean gas or vacuum system can be obtained efficiently and the equipment can be easily maintained. Especially when high adsorption performance is desired, it is preferable to use a natural mordenite with iron impurity content of less than 0.2 wt% in terms of $Fe_2O_3$.

It will be obvious to those skilled in the art that the arrangements of FIGS. 10 and 12 can be modified for various uses.

For example, if a Peltier element is used as a coolant, electrical cooling can be employed, but in this case, it is preferred to perform re-activation of the adsorbent outside the adsorption chamber. It is a matter of design choice whether the coolant container is provided inside or outside the adsorption chamber. The relative arrangement and combination of the adsorbent and the heat conducting member can be modified optionally according to the purpose. The iron content of natural zeolite can also be selected depending on the cost desired. For example, natural mordenites containing less than about 0.7, about 1.5, about 4 and about 10 wt% of iron converted in terms of $Fe_2O_3$, respectively can be selectively employed. For higher adsorption performance, it is also possible to use liquid hydrogen, liquid helium or the like as the coolant. In the case of employing the liquid helium, it is desirable to thermally shield the liquid helium from the outside through utilization of a double structure for enveloping the liquid helium with the liquid nitrogen, as it is well known in the field of low-temperature technology.

The present invention has been described in connection with a limited number of embodiments, but it will be apparent that the invention is not limited specifically thereto and that many modifications and alterations may be effected. For example, the present invention can be applied to almost all the usages achievable by the conventional zeolite technology, such, for example, as the formation of a catalyst and collection of a desired material by using natural zeolite with small iron impurity content.

What is claimed is:

1. Method of treating a starting fluid rich in adsorbable substance for removing said adsorbable substance substantially completely therefrom to provide a treated fluid substantially free from said adsorbable substance, and carried out in a hermetic adsorption chamber of high thermal conductivity and heat resistance and capable of withstanding elevated temperatures of about 300°-600° C. and having an inlet for passing said starting fluid into said chamber, an outlet for recovering said treated fluid therefrom, thermally conductive surface means defining an internal space within said chamber for receiving a porous adsorbent therein, and means for heating said adsorbent and the adjacent thermally conductive surface means to said temperatures of about 300°-600° C., which comprises the steps of passing said starting fluid through said inlet and into adsorbing contact with a porous adsorbent received in said internal space and which is of natural zeolite mineral origin, which has been ore dressed and then classified according to its iron impurity content and which constitutes a composition corresponding to that consisting essentially of more than about 90% by weight but less than about 99.8% by weight of a granular mordenitic or granular clinoptilolitic natural zeolite mineral origin material having a silicon to aluminum atomic ratio of more than about 4, the balance being iron present as naturally occurring impurity in association with the zeolite mineral origin granular material and calculated as $Fe_2O_3$, and sufficiently to adsorb substantially completely said adsorbable substance on said composition and thereby remove said adsorbable substance from said starting fluid to provide said treated fluid substantially free from said adsorbable substance, recovering said treated fluid through said outlet, and for the purposes of reactivating said composition, thereafter interrupting the passing and recovering steps, and heating said composition and adjacent surface means by said heating means to about 300°-600° C. and sufficiently to desorb substantially completely said adsorbable substance from said composition and thereby reactivate said composition and to desorb any said adsorbable substance which has been adsorbed onto said adjacent surface means, and removing the so desorbed adsorbable substance from said chamber, and subsequently repeating said passing and recovering steps.

2. Method according to claim 1, wherein said composition is cooled during said passing and recovering steps.

3. Method according to claim 2, wherein said starting fluid contains water vapor and is passed into contact with said composition sufficiently to dehydrate said fluid to a dew point below about $-196°$ C.

4. Method according to claim 1, wherein said balance of iron constitutes less than about 0.7% by weight calculated as $Fe_2O_3$.

5. Method according to claim 1, wherein said balance of iron constitutes about 0.7-1.5% by weight calculated as $Fe_2O_3$.

6. Method according to claim 1, wherein said balance of iron constitutes about 1.5-4% by weight calculated as $Fe_2O_3$.

7. Method of removing an adsorbable substance from a fluid which comprises the steps of contacting in a hermetic zone a starting fluid rich is adsorbable substance with a porous adsorbent which is of natural zeolite mineral origin, which has been ore dressed and then classified according to its iron impurity content, and which constitutes a composition corresponding to that consisting essentially of more than about 90% by weight but less than about 99.8% by weight of a granular mordenitic or granular clinoptilolitic natural zeolite mineral origin material having a silicon to aluminum atomic ratio of more than about 4, the balance being iron present as naturally occurring impurity in association with the zeolite mineral origin granular material and calculated as $Fe_2O_3$, and sufficiently to adsorb substantially completely said adsorbable substance on said composition and thereby remove said adsorbable substance from said starting fluid to provide a treated fluid substantially free from said adsorbable substance, recovering said treated fluid from said zone, and for the purposes of reactivating said composition, thereafter interrupting said contacting and recovering steps, heating said composition to about 300°-600° C. and sufficiently to desorb substantially completely said adsorbable substance from said composition and thereby reactivate said composition, and removing the so desorbed adsorbable substance from said zone, and subsequently repeating said contacting and recovering steps.

8. Method according to claim 7, wherein said composition is cooled during said passing and recovering steps.

9. Method according to claim 8, wherein said starting fluid contains water vapor and is contacted with said composition sufficiently to dehydrate said fluid to a dew point below about $-196°$ C.

10. Method according to claim 7, wherein said balance of iron constitutes less than about 0.7% by weight calculated as $Fe_2O_3$.

11. Method according to claim 7, wherein said balance of iron constitutes about 0.7-1.5% by weight calculated as $Fe_2O_3$.

12. Method according to claim 7, wherein said balance of iron constitutes about 1.5-4% by weight calculated as $Fe_2O_3$.

13. In an adsorption equipment comprising a hermetic adsorption chamber having a porous adsorbent therein, the improvement wherein said porous adsorbent is a composition consisting essentially of more than 90% by weight but less than 99.8% by weight of a granular mordenitic or granular clinoptilolitic material having a silicon to aluminum atomic ratio of more than about 4, the balance being iron present as naturally occurring impurity in association with the mordenitic or clinoptilolitic material of the composition and calculated as $Fe_2O_3$, and wherein said hermetic adsorption chamber is made of heat resistant material and has a first opening permitting the passage therethrough of a fluid rich in adsorbable substance and a second opening permitting the passage therethrough of a fluid free of said adsorbable substance, a top wall, a bottom wall, a side wall and means for heating said adsorbent composition in said adsorption chamber and within said walls to a temperature of about 300°-600° C.

14. Equipment according to claim 13, wherein a pretreatment chamber is connected to said first opening of said adsorption chamber and contains a catalyst which contains therein an oxidizable substance.

* * * * *